United States Patent [19]

Blohm et al.

[11] Patent Number: 5,596,048
[45] Date of Patent: Jan. 21, 1997

[54] METHOD FOR MAKING COPOLYMERS OF POLYARYLENE ETHERS AND SILOXANES

[75] Inventors: Margaret L. Blohm, Schenectady; Timothy E. Banach, Scotia, both of N.Y.; Christian M. E. Bailly, Antwerp, Belgium

[73] Assignee: General Electric Company, Schenectady, N.Y.

[21] Appl. No.: 543,746

[22] Filed: Oct. 16, 1995

[51] Int. Cl.$^6$ ............................ C08L 71/12; C08L 83/04
[52] U.S. Cl. ......................................................... 525/393
[58] Field of Search ................................................ 525/393

[56] References Cited

U.S. PATENT DOCUMENTS

| | | | |
|---|---|---|---|
| 3,496,236 | 2/1970 | Cooper et al. | 525/390 |
| 3,668,273 | 6/1972 | Krantz | 525/393 |
| 3,696,137 | 10/1972 | Clark et al. | 528/38 |
| 4,814,392 | 3/1989 | Shea et al. | 525/391 |
| 5,204,438 | 4/1993 | Snow et al. | 528/25 |
| 5,281,686 | 1/1994 | Blohm et al. | 528/29 |
| 5,357,022 | 10/1994 | Banach et al. | 525/393 |
| 5,385,984 | 1/1995 | Blohm et al. | 525/393 |

*Primary Examiner*—Thomas Hamilton, III
*Attorney, Agent, or Firm*—William H. Pittman

[57] ABSTRACT

A process for making polyarylene ether-siloxane copolymers is described and the process comprises the step of contacting polyarylene ethers with a hydroxyaromatic or aromatic ether terminated siloxane reagent in the presence of an oxidant.

11 Claims, No Drawings

METHOD FOR MAKING COPOLYMERS OF POLYARYLENE ETHERS AND SILOXANES

FIELD OF THE INVENTION

The instant invention is directed to a process for making polyarylene ether copolymers. More particularly, the invention is directed to a process for making polyphenylene ether-siloxane copolymers from high molecular weight polyphenylene ethers in the presence of an oxidant.

BACKGROUND OF THE INVENTION

Polyphenylene ethers are a widely used class of thermoplastic engineering resins characterized by excellent hydrolytic stability, dimensional stability, toughness, heat resistance and dielectric properties. They are, however, deficient in certain other properties including workability and flame retardancy. Therefore, there is a continuing search for a means to modify polyphenylene ethers to improve these other properties.

Among the means being studied are blending of polyphenylene ethers with certain other materials including those comprising phosphorus. Nevertheless, molded parts fabricated from such materials generally display degradations in properties including a decrease in glass transition temperatures.

Other means being studied include copolymers of polyphenylene ethers and polysiloxanes. However, such copolymers are often not desirable since methods for producing them are often expensive and result in unstable copolymers which are difficult to process.

It is of increasing interest, therefore, to prepare stable polyarylene ether copolymers which display flame retardancy and are prepared via cost effective methods.

DESCRIPTION OF THE PRIOR ART

Efforts have been disclosed for producing polyphenylene ether copolymers. In U.S. Pat. No. 5,204,438, the disclosure of which is incorporated herein by reference, the conversion of phenol-siloxane macromers to a silicone polyphenylene ether graft copolymer is described.

Other efforts have been described for producing polyphenylene ether copolymers. In U.S. Pat. No. 4,814,392, the disclosure of which is incorporated herein by reference, a method for making silicone-polyarylene ether block copolymers is described.

SUMMARY OF THE INVENTION

The instant invention is directed to a method for making polyarylene ether copolymers comprising the step of contacting:

(a) a polyarylene ether;

(b) a hydroxyaromatic terminated siloxane reagent; and (c) an oxidant.

In the invention, the polyarylene ether copolymers are unexpectedly prepared from the siloxane reagent and polyarylene ether. Therefore, the simultaneous polymerization of siloxane containing reagents (as described in (b)) and polyarylene ether precursors like hydroxyaromatic monomers is not required. This is true because the copolymers are prepared via redistribution. Redistribution as used herein is defined to mean the preparation of copolymers from reagents and polymers wherein the resulting copolymers have a polyarylene ether portion with a lower molecular weight than the initial polyarylene ether it is prepared from. Moreover, reagents, as used herein, are defined to mean hydroxyaromatic terminated monomers and polymers which are capable of forming a copolymer with a polyarylene ether. Additionally, the resulting copolymers display flame retardant properties as set out in the table which follows.

DETAILED DESCRIPTION OF THE PREFERRED EMBODIMENTS

There is no limitation with respect to the polyarylene ethers that may be employed in this invention. Often, however, the polyarylene ethers are polyphenylene ethers.

The polyphenylene ethers preferably employed in this invention include both homopolymer and copolymer polyphenylene ethers. Suitable homopolymers are those which contain, for example, 2,6-dimethyl-1,4-phenylene ether units. Suitable copolymers include, for instance, graft, block or random copolymers containing such units in combination with 2,3,6-trimethyl-1,4-phenylene ether units. Such polyphenylene ethers are typically prepared by oxidative coupling at least one corresponding monohydroxyaromatic compound. Moreover, any of the conventional polyphenylene ether impact modifiers/additives may be employed in this invention. They include, for example, rubbery interpolymers of ethylene and $\alpha$-olefins, AB (diblock) and ABA (triblock) copolymers and core-shell graft copolymers of alkenylaromatic and diene compounds, especially those comprising styrene and butadiene or isoprene blocks. Additionally, suitable lubricants such as hydrogenated poly($\alpha$-olefins) may be employed as well as talc additives, functionalized elastomers and reinforcing and non-reinforcing fillers.

Detailed descriptions of the process for producing such polyphenylene ethers may be found in U.S. Pat. Nos. 3,306,874, 3,306,875, 3,914,266 and 4,028,341, the disclosures of which are incorporated herein by reference.

The hydroxyaromatic terminated siloxane reagents employed in this invention are not limited and are often represented by the formula

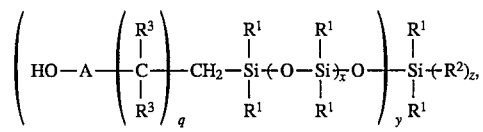

wherein:

(i) each A is independently a divalent aromatic radical;

(ii) each $R^1$ is independently a haloalkyl, $C_{1-10}$ alkyl or substituted or unsubstituted aromatic radical;

(iii) $R^2$ is a haloalkyl, $C_{1-10}$ alkyl or substituted or unsubstituted aromatic radical;

(iv) q is any integer greater than or equal to 1;

(v) x is an integer from 1 to 1,000,000;

(vi) y is 1 or 2;

(vii) z is 0 or 1, with the proviso that when y is 1, z is 1 and when y is 2, z is 0; and (viii) $R^3$ is hydrogen, $C_{1-10}$ alkyl or a substituted or unsubstituted aromatic radical.

It is often preferred, however, that R is hydrogen, A is 1,4-phenylene, $R^1$ is a methyl group, q is 3, x is an integer from about 10 to about 100, y is 2 and z is 0.

Such reagents are commercially available and/or often prepared, for example, by the hydrosilation of allylphenols with hydride terminated dimethyl siloxane groups. A further description of the preparation of such reagents may be found in U.S. Pat. No. 5,204,438, the disclosure of which is incorporated herein by reference.

There is no limitation with respect to the oxidants which may be employed in this invention, other than that they are those which do not interfere with copolymer formation.

An illustrative list of the oxidants which may be employed in this invention include air, oxygen, peroxides and quinones. Often, benzoylperoxide, dicumylperoxide, quinone, dimethylquinone, tetramethylquinone and especially tetramethyldiphenoquinone (TMDQ) are preferred. Such oxidants are, for example, naturally occurring, commercially available by-products of oxidative polymerizations and/or prepared via conventional methods which include reacting an aryl acid halide and sodium peroxide in solution.

When preparing the polyarylene ether copolymers of this invention, any conventional reaction vessel may be employed including round bottom reaction flasks. The reaction vessel may be typically charged with a substantially inert organic solvent such as toluene, followed by the addition of polyarylene ether. The resulting mixture may be stirred and may be heated to produce a redistribution solution. The redistribution solution may subsequently be charged with hydroxyaromatic terminated siloxane reagents, producing a reaction solution. The reaction solution can then be charged with an oxidant and the desired copolymers may be recovered via conventional methods, including precipitation followed by filtration. The desired copolymers are typically polyarylene ether-siloxane copolymers like poly(2,6-dimethyl-1,4-phenylene ether)-copoly(dimethylsiloxane).

It is noted herein that the order of addition of reactants to the reaction vessel is not critical and the reactants may be added in any order which results in copolymer formation.

The temperature at which the redistribution/copolymer formation occurs is not limited; however, the temperature is often from about ambient to about 215° C. and preferably from about 85° C. to about 110° C. Additionally, there is no limitation with respect to the pressure at which the instant invention is conducted, other than that the desired pressure allows for copolymer formation. Typically, however, the pressure is from about atmospheric to about 150 psi and preferably about atmospheric.

There is no limitation with respect to the amount of polyarylene ether, hydroxyaromatic terminated siloxane reagent and oxidant used in this invention, other than that the amounts employed result in copolymer formation. Additionally, reaction times are limited only to the extent that copolymer is formed.

The following examples are provided to further illustrate and facilitate the understanding of the instant invention. The products obtained may be confirmed by conventional techniques such as proton and carbon-13 nuclear magnetic resonance spectroscopy and GPC analysis.

EXAMPLE 1

A 250 mL three-necked round bottom flask immersed in an oil bath heater and equipped with a mechanical stirrer, reflux condenser and an internal thermometer was charged with 170 mL of toluene. The toluene was heated to about 90° C. and 60 g of poly(2,6-dimethyl-1,4-phenylene ether) (intrinsic vicosity 0.49 at 25° C.) were added. The resulting mixture was stirred producing a yellowish solution. To the yellowish solution was added 2.25 g (1.25 mmol) of a eugenol terminated polydimethylsiloxane and the resulting mixture was stirred for approximately 5 minutes. To the resulting clear solution was added 0.3 g of (1.250 mmol) TMDQ, producing a red solution. The red solution was stirred and maintained at a temperature of about 95° C. for about 1 hour after which it was transferred to a 2 L separation flask and diluted with 200 mL toluene. Subsequently, copolymer precipitated after adding 1 L of methanol. The copolymer, a fine white precipitate, was collected on a glass frit and twice washed with additional methanol then dried in an 80° C. vacuum oven for 16 hours. Recovered was 61.41 g copolymer (98.2% yield).

EXAMPLE 2

Example 2 was conducted in a manner similar to the one described in Example 1 except that 0.3 g of benzoylperoxide were used in lieu of TMDQ. Recovered was 60.10 g of copolymer (96.1% yield).

EXAMPLE 3

Example 3 was conducted in a manner similar to the one described in Example 1 except that the solution was contaminated with about 5.0% amines (dibutylamine and butyldimethylamine catalysts in order to mimic polyphenylene ether production solution. 59.4 g of copolymer (95.0% yield) were recovered.

The data in the table which follows is provided to demonstrate that redistribution and copolymerization occur after subjecting polyarylene ether to a terminated reagent (as described above in (b)) and an oxidant. Moreover, depending upon the molecular weight of the siloxane present, the intrinsic viscosity of the copolymer formed may be construed to indicate that the molecular weight of the initial polyarylene ether did decrease after copolymer formation. All copolymers were prepared in a manner similar to those described in the examples.

| Entry | Terminated[A] Reagent, r | Mole %[B, C] Oxidant | Polyphenylene[D] ether Intrinsic Viscosity (25° C.) | Copolymer[D] Intrinsic Viscosity (25° C.) | Flame Retardancy |
|---|---|---|---|---|---|
| 1 | None | 0.5 T | 0.54 | 0.48 | V-1 |
| 2 | Y, 15 | 0.5 T | 0.54 | 0.42 | V-0 |
| 3 | z, 100 | 0.25 T | 0.54 | 0.45 | V-1 |
| 4 | z, 20 | 0.75 B | 0.54 | 0.41 | V-0 |
| 5 | z, 20 | 0.25 B | 0.49 | 0.44 | V-0 |
| 6 | z, 20 | 0.25 T | 0.49 | 0.41 | V-0 |
| 7 | Y, 55 | 1.0 T | 0.49 | 0.24 | — |
| 8 | z, 10 | 1.0 T | 0.49 | 0.32 | — |
| 9 | z, 50 | 0.5 T | 0.49 | 0.34 | — |
| 10 | z, 100 | 0.25 T | 0.49 | 0.38 | — |
| 11 | z, 50 | 0.25 T | 0.49 | 0.40 | — |

-continued

| Entry | Terminated[A] Reagent, r | Mole %[B,C] Oxidant | Polyphenylene[D] ether Intrinsic Viscosity (25° C.) | Copolymer[D] Intrinsic Viscosity (25° C.) | Flame Retardancy |
|---|---|---|---|---|---|
| 12 | z, 50 | 0.10 T | 0.49 | 0.37 | — |

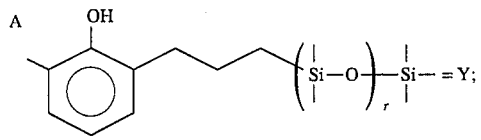

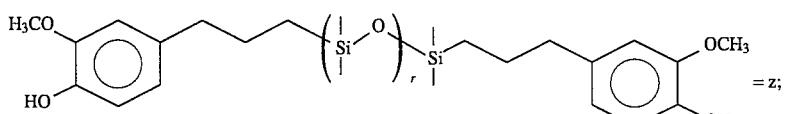

r is the value for r in the formulae.
[B]Mole percent oxidant based on moles of repeat unit on polyphenylene ether backbone; T = TMDQ; B = benzoyl peroxide.
[C]Mole percent of terminated reagent is equal to the mole percent of oxidant, except in entries 11 and 12 where 0.5 mole percent of terminated reagent was used.
[D]Intrinsic viscosity (dl/g).
[E]Flame retardancy based on UL-94 ASTM standards.

What is claimed is:

1. A method for making polyarylene ether copolymers comprising the step of contacting:
   (a) a polyarylene ether;
   (b) a hydroxyaromatic terminated siloxane reagent; and
   (c) an oxidant, whereby the polyarylene ether portion of said copolymer has a lower molecular weight than the initial polyarylene ether.

2. A method for making polyarylene ether copolymers in accordance with claim 1 wherein said polyarylene ether is a polyphenylene ether homopolymer or copolymer.

3. A method for making polyarylene ether copolymers in accordance with claim 2 wherein said polyphenylene ether homopolymer comprises 2,6-dimethyl-1,4-phenylene ether units and said polyphenylene ether copolymer comprises 2,6-dimethyl-1,4-phenylene ether units and 2,3,6-trimethyl-1,4-phenylene ether units.

4. A method for making polyarylene ether copolymers in accordance with claim 1 wherein said hydroxyaromatic terminated siloxane reagent is represented by the formula

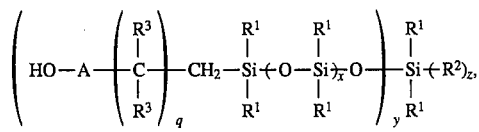

wherein:
   (i) each A is independently a divalent aromatic radical;
   (ii) each $R^1$ is independently a haloalkyl, $C_{1-10}$ alkyl or substituted or unsubstituted aromatic radical;
   (iii) $R^2$ is a haloalkyl, $C_{1-10}$ alkyl or substituted or unsubstituted aromatic radical;
   (iv) q is any integer greater than or equal to 1;
   (v) x is an integer from 1 to 1,000,000;
   (vi) y is 1 or 2;
   (vii) z is 0 or 1, with the proviso that when y is 1, z is 1 and when y is 2, z is 0; and
   (viii) $R^3$ is hydrogen, $C_{1-10}$ alkyl or a substituted or unsubstituted aromatic radical.

5. A method for making polyarylene ether copolymers in accordance with claim 4 wherein said formula represents a hydroxyaromatic terminated siloxane reagent wherein A is 1,4-phenylene, $R^1$ is a methyl group, q is 3, x is an integer from about 10 to about 100, y is 2 and z is 0.

6. A method for making polyarylene ether copolymers in accordance with claim 1 wherein said oxidant is air, oxygen, peroxides or quinones.

7. A method for making polyarylene ether copolymers in accordance with claim 6 wherein said peroxides are benzoylperoxide or dicumylperoxide and said quinones are quinone, dimethylquinone, tetramethylquinone or tetramethyldiphenoquinone.

8. A method for making polyarylene ether copolymers in accordance with claim 1 wherein said method is conducted at a temperature from about ambient to about 215° C.

9. A method for making polyarylene ether copolymers in accordance with claim 1 wherein said method is conducted at a pressure from about atmospheric to about 150 psi.

10. A method for making polyarylene ether copolymers in accordance with claim 1 wherein said copolymers are polyarylene ether-siloxane copolymers.

11. A method for making polyarylene ether copolymers in accordance with claim 10 wherein said polyarylene ether-siloxane copolymers are poly(2,6-dimethyl-1,4-phenylene ether)-copoly(dimethylsiloxane).

* * * * *